M. A. SWEET.
DIAL SCALE.
APPLICATION FILED JUNE 23, 1917.
1,334,472.
Patented Mar. 23, 1920.
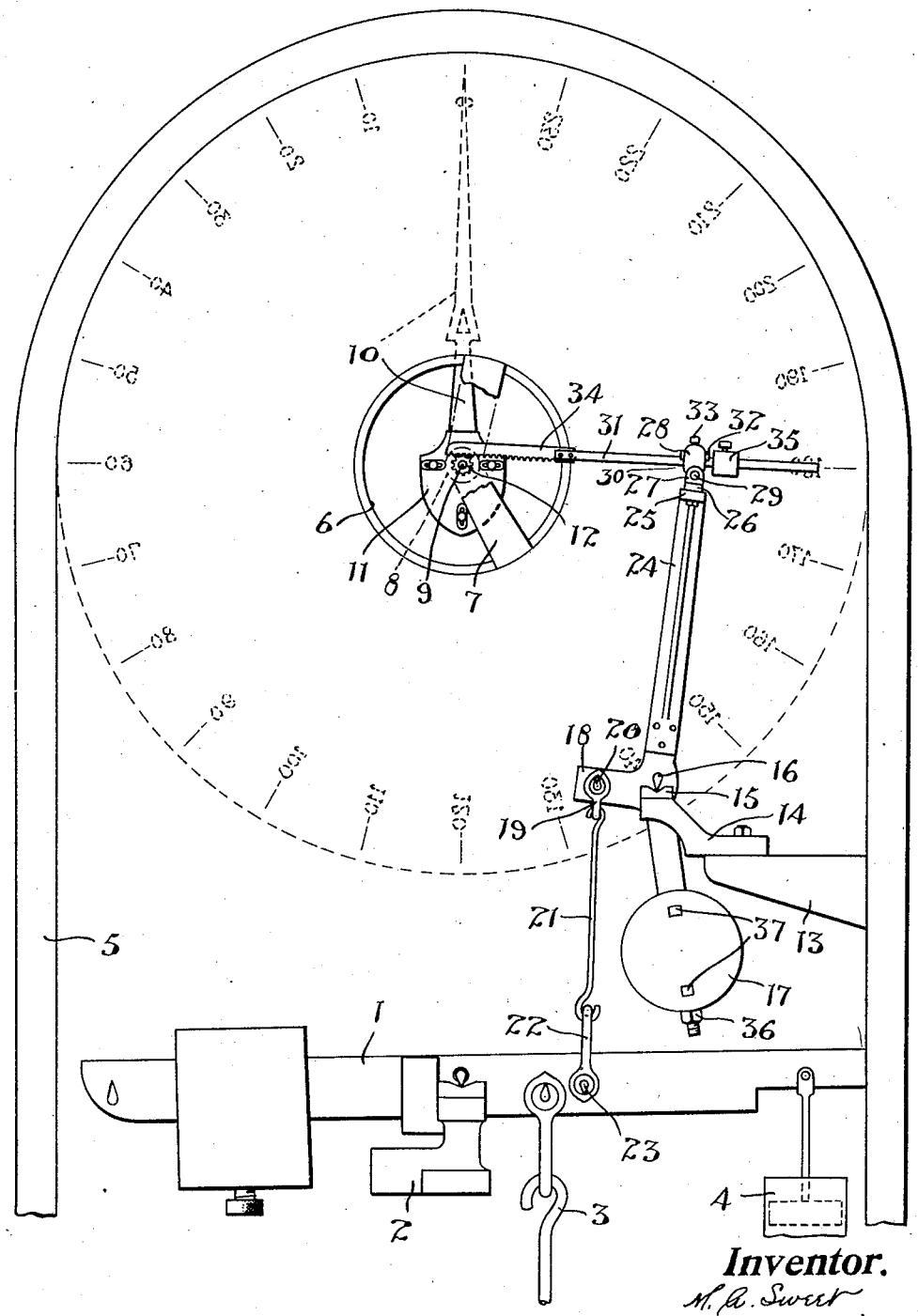
Inventor.
M. A. Sweet
by A. J. S. Dennison
Atty.

UNITED STATES PATENT OFFICE.

MELVIN ARVINE SWEET, OF HAMILTON, ONTARIO, CANADA, ASSIGNOR TO GURNEY SCALE COMPANY, OF HAMILTON, ONTARIO, CANADA.

DIAL-SCALE.

1,334,472.  Specification of Letters Patent.  Patented Mar. 23, 1920.

Application filed June 23, 1917. Serial No. 176,572.

*To all whom it may concern:*

Be it known that I, MELVIN ARVINE SWEET, a citizen of the United States of America, and resident of the city of Hamilton, county of Wentworth, Province of Ontario, in the Dominion of Canada, have invented certain new and useful Improvements in Dial-Scales, as described in the following specification and illustrated in the accompanying drawings, that form part of the same.

The principal objects of this invention are, to eliminate the transference of vibrations in the scale to the registering finger, and to devise a simple form of registering mechanism which though very sensitive will not be liable to get out of order and will register definitely and accurately the loads placed upon the beam.

The principal feature of the invention consists in the novel construction and arrangement of the pendulum and the operating connection to the indicating hand, whereby the pendulum is supported in a low down position and the arm for operating the indicating finger is supported in a balanced arrangement from the pendulum.

The drawing represents an elevational view of the rear side of a scale showing the beam pendulum and indicator operating mechanism.

The present form of apparatus is particularly applicable to platform scales but in the accompanying drawing the platform and its supporting arrangements are not shown. The scale beam 1 is carried on the main fulcrum support 2 which is rigidly supported in the frame of the scale and 3 is the steelyard connection between the scale beam and the platform levers.

A suitable dash pot 4 is arranged at the outer end of the beam.

The dial frame 5 extends upwardly from the base, which is not shown, and a suitable dial is arranged upon the outer face, the numerals being here shown in dotted lines.

Centrally of the dial the frame is formed with a circular opening 6 and a bridge 7 extends rearwardly across said opening, the bridge being here shown broken away. The bridge is provided with a central boss 8 which supports the spindle 9 of the indicating finger 10 which finger is suitably counter-balanced by the shield 11. A spur pinion 12 is secured upon the indicator spindle 9.

The frame 5 is provided with a bracket 13 extending inwardly from one side thereof a short distance above the beam 1 and upon this bracket is supported an adjustable bracket 14 which carries at its outer end the pivot support 15 for the pendulum.

The pendulum is formed of an arm which extends downwardly from the pivot 16 carrying the adjustable weight 17 and the arm extends upwardly to a point substantially in horizontal alinement with the indicator spindle 9.

An arm 18 extends laterally from the pendulum arm and this arm carries a shackle 19 upon a pivot 20 and a link 21 connects the shackle 19 with the shackle 22 engaging a pivot 23 arranged upon the scale beam adjacent to the pivot connection to the steelyard.

It will thus be seen that the swinging movement of the beam upon its fulcrum will be transmitted to the pendulum through the connections described and these connections are comparatively short, the pendulum being supported low down in the frame.

The upper pendulum arm 24 is formed with an angularly shaped upper end 25 upon which a bracket 26 is adjustably mounted, being secured thereon by bolts extending through slots in the base of the bracket. The bracket 26 is provided with a pair of upwardly extending lugs 27 between which a block 28 is supported on the pin 29.

The block 28 is formed with a transverse orifice 30 in which a rod 31 is adjustably secured, being held in position by the key 32 and set screw 33.

A rack 34 is secured to the inner end of the rod 31 and this rack rests upon and meshes with the pinion 12 of the indicator spindle 9. A counter-balance 35 is adjustably secured on the rod 31 at the outer side of the pivotal block 28. This counter-balance is so arranged that the weight of the rod 31 and rack 34 on the inward side is just sufficient to maintain it in gear to rotate the indicating finger.

In the operation of this device the pull of the load upon the steelyard and its connections to the beam swings the beam upon its main fulcrum and the downward movement of the beam at the point of connection of the shackle 22 pulls upon the pendulum through the lever connection of the short arm 18. The pendulum as thus short coupled does not unduly magnify any vibration in the beam or in the frame and as the support of the pendulum is low down upon the frame the transmission of vibrations in the frame to the pendulum are rendered negligible.

The pendulum weight 17 is adjusted by means of the nut 36 secured on the threaded end of the pendulum arm and fastened securely by set screws 37. This weight is adjusted so that the upper end of the arm 24 will swing in direct proportion to the load and to the gear ratio of the rack and pinion operating the indicating arm and the pivotal support of the rack rod further eliminates the transference of vibrations with the ultimate result that the indicating finger moves with a steady non-vibratory movement to the point indicating the ultimate load and without jumping beyond it and vibrating back and forth as is the case in other scales of this type.

With a construction such as described a very reliable and positively operating scale is produced which fully meets the requirements of the Government regulations.

What I claim as my invention is:—

1. In a dial scale, the combination with the pivoted weigh beam and a rotatable indicating finger having a spur pinion on its supporting spindle, of a pendulum pivotally supported intermediate of its length at a point between the beam and the spindle of the indicator and having a lateral extension intermediate of its length, means connecting said lateral extension of the pendulum with the beam, a bracket adjustably secured on the upper end of said pendulum, a block pivotally mounted in said adjustable bracket, and a rod secured in said pivotal block and extending over the spindle of the indicator finger and having rack teeth engaging said pinion to rotate the finger.

2. In a dial scale, the combination with the pivoted weigh beam and a rotatable indicating finger having a spur pinion on its supporting spindle, of a pendulum pivotally supported intermediate of its length at a point between the beam and the spindle of the indicator and having a lateral extension intermediate of its length, means connecting said lateral extension of the pendulum with the beam, a block pivotally mounted on the upper end of said pendulum, and a counter-balanced rod secured in said pivotal block and extending over the spindle of the indicator finger and having rack teeth engaging said pinion to rotate the finger.

3. In a dial scale, a frame having a dial and a centrally arranged rotatable indicating finger, a pivoted weigh beam, a rigid bracket arranged on the frame above the beam and below the finger support, a laterally adjustable bracket mounted on said rigid bracket, a pendulum having a pivot arranged intermediate of its length and supported on said adjustable bracket and having a lever extension adjacent to said pivot, a link connection between said lever and said beam, and a rack arm pivotally secured to the upper end of the pendulum and operatively engaging said indicating finger.

MELVIN ARVINE SWEET.

Witnesses:
E. G. BINKLEY,
W. STUDMAN.